(12) United States Patent
Kim et al.

(10) Patent No.: US 6,394,377 B1
(45) Date of Patent: May 28, 2002

(54) DEVICE FOR CRUSHING FOODSTUFFS

(75) Inventors: Go Jung Kim, Nonsan; Yeon Soo Kim, Busan, both of (KR)

(73) Assignee: Donga Oscar Co., Ltd., Busan (KR)

( * ) Notice: Subject to any disclaimer, the term of this patent is extended or adjusted under 35 U.S.C. 154(b) by 18 days.

(21) Appl. No.: 09/634,587

(22) Filed: Aug. 8, 2000

(30) Foreign Application Priority Data

Sep. 2, 1999 (KR) .............................................. 99-37067

(51) Int. Cl.⁷ ............................. B02C 19/22; B02B 3/06
(52) U.S. Cl. ...................................... 241/260.1; 241/74
(58) Field of Search ................................ 241/260.1, 74

(56) References Cited

U.S. PATENT DOCUMENTS

| | | | | |
|---|---|---|---|---|
| 4,038,433 A | * | 7/1977 | Manser et al. | 426/615 |
| 4,104,958 A | * | 8/1978 | Manser et al. | 241/260.1 |
| RE31,631 E | * | 7/1984 | McFarland | 100/117 |
| 5,906,154 A | * | 5/1999 | Yoon et al. | 100/117 |
| 6,149,083 A | * | 11/2000 | McFarland | 241/186.5 |

* cited by examiner

Primary Examiner—David Jones
Assistant Examiner—William Hong
(74) Attorney, Agent, or Firm—Staas & Halsey LLP

(57) ABSTRACT

Device for crushing foodstuffs. The device has a housing for a user hold; a motor installed inside the housing; a drum member has an inlet portion for introducing foodstuffs therein and an extended portion; an internal cylindrical member being formed with a plurality of screw knife-edges and being formed with a shoulder along a front portion thereof for blocking a sludge penetration; a screw member being formed with a transferring thread portion including cut portions for pre-crushing, and a crushing thread portion including jaws for increasing a frictional force; and a cap assembled to the drum member for fixing the internal cylindrical member. The internal cylindrical member and the screw member are surface treated for anti-fermentation. The foodstuffs are easily moved and crushed, resulting in a reliance of the defect-free structure, and the fermentation of the remaining sludge is restrained.

9 Claims, 3 Drawing Sheets

DEVICE FOR CRUSHING FOODSTUFFS

BACKGROUND OF THE INVENTION

This invention relates to a device for crushing foodstuffs for kitchen and domestic use which extracts or crushes the vegetables or fruits, drawn through a drum member, within a tapered cylindrical member in which a screw member slowly rotates, thereby crushing the vegetables or fruits and accordingly extracting the juice therefrom.

Many crushers have been proposed. Generally, they have some form of plunger which is forced down a barrel to squeeze and crush or mash the garlic against a perforated plate. In this way, the garlic becomes crushed and small pieces of flesh and the juice are forced through the perforations.

Another type of the conventional crusher includes a hollow cylindrical inlet member being formed with an inlet opening at a front portion thereof and a hollow cylindrical crushing member being formed with knife-edges at an inner surface thereof. The inlet member and the crushing member are engaged with each other, and a screw member which is being successively formed with a transferring thread portion and a crushing thread portion on the outer surface thereof and is connected to a motor is pressed inside the crushing member. With the actuation of the motor, the screw rotates so that it moves the vegetables or fruits drawn through the inlet opening toward the crushing thread portion so as to crush the same between the knife-edges and the crushing thread portion and discharge the juice and crushed stuffs.

However, the foodstuffs transfer mechanism of the conventional crusher is achieved by the motor making the screw thread rotate, and as a result of increase of the volume of the foodstuff to be compressed, the load applied onto the crushing member or squeezing member becomes larger with the foodstuff progression. So, there is a possibility of a breakdown or a damage of the crushing or squeezing member. In addition, since the crushing operation depends solely on the frictional interaction between the knife-edges and the crushing thread portion, there may present a transfer of uncrushed foodstuff along the transferring thread portion in case of a relatively large foodstuff particle size. This results in a decrease of the crushing efficiency and crushing out a relatively crude stuffs.

Furthermore, within the crusher, there remains a sludge which eventually ferment, resulting in an insanitary environment therein.

BRIEF SUMMARY OF THE INVENTION

It is therefore an object of the present invention in one aspect to provide a crusher for domestic use where the aforementioned problems are avoided.

According to the invention there is provided a device for crushing foodstuffs, comprising: a housing for a user hold; a motor installed inside the housing; a drum member being assembled to a front portion of the housing and including an inlet portion for introducing foodstuffs therein and an extended portion integrally formed with the inlet portion; an internal cylindrical member inserted into the extended portion of the drum member, the internal cylindrical member being formed with a plurality of screw knife-edges along the inner peripheral surface thereof; a screw member inserted into the internal cylindrical member and formed with a plurality of cut portions for pre-crushing the foodstuffs drawn down thereonto, the screw member being successively formed with a transferring thread portion and a crushing thread portion at outer surface thereof; and a cap assembled to a front portion of the extended portion of the drum member for fixing the internal cylindrical member to the drum member.

In accordance with a preferred embodiment of the invention, the crushing thread portion of the screw member is formed with a plurality of jaws for increasing a frictional force against the inner cylindrical member. Preferably, the jaws are located between the thread pitches.

In accordance with a preferred embodiment of the invention, the internal cylindrical member is formed with a shoulder along a front circumferential portion thereof for fixedly engaging with the cap.

In accordance with a preferred embodiment of the invention, engaging portions between the internal cylindrical member and the cap are tapered for press-fit the same.

As an important aspect of the invention, the internal cylindrical member and the screw member are surface treated for anti-fermentation. The surface treatment includes melamine resin plus ceramic powder deposition and anti-fermentation liquid coating.

As an alternatives, a cylindrical mesh member is provided, the mesh member replacing the internal cylindrical member in case of crushing a juice.

By the use of the present invention, the foodstuffs to be crushed can be easily moved and effectively crushed by way of the cut portions at the transferring thread portion of the screw member and is finally crushed finely by way of the jaws between the crushing thread portion, resulting in a reliance of the defect-free structure. In addition, the fermentation of the sludge is restrained by the way of the shoulder structure at the front of the internal cylindrical member.

BRIEF DESCRIPTION OF THE DRAWINGS

A device for crushing foodstuffs according to the invention will now be described, by way of example, with reference to the accompanying drawings, in which.

DESCRIPTION OF THE PREFERRED EMBODIMENT

Hereinafter, the device for crushing foodstuffs will be described in detail with the accompanying drawings. For simplicity, a device for crushing foodstuffs according to the invention will hereinafter be called a "crusher".

Figure 1:
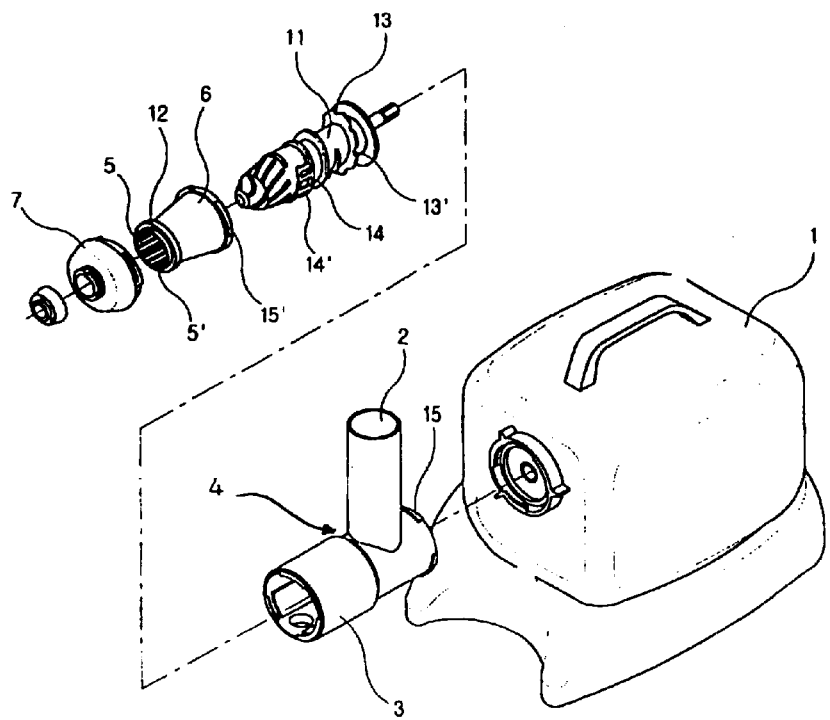
FIG. 1 is an exploded perspective view of the crusher in accordance with the present invention.
Figure 2:
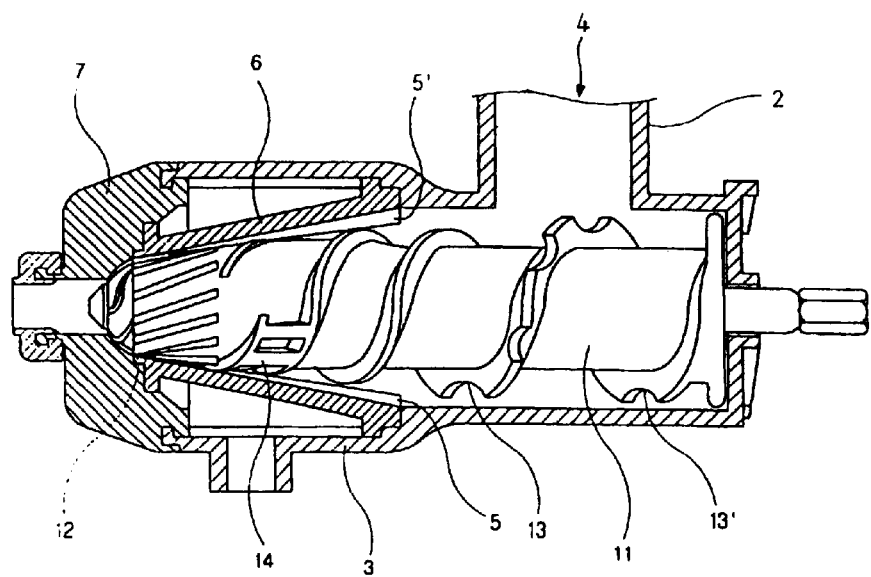
FIG. 2 is a cross-sectional view of the crusher.

FIG. 1 is an exploded perspective view of the invention and FIG. 2 is a cross-sectional view thereof.

Figure 3:
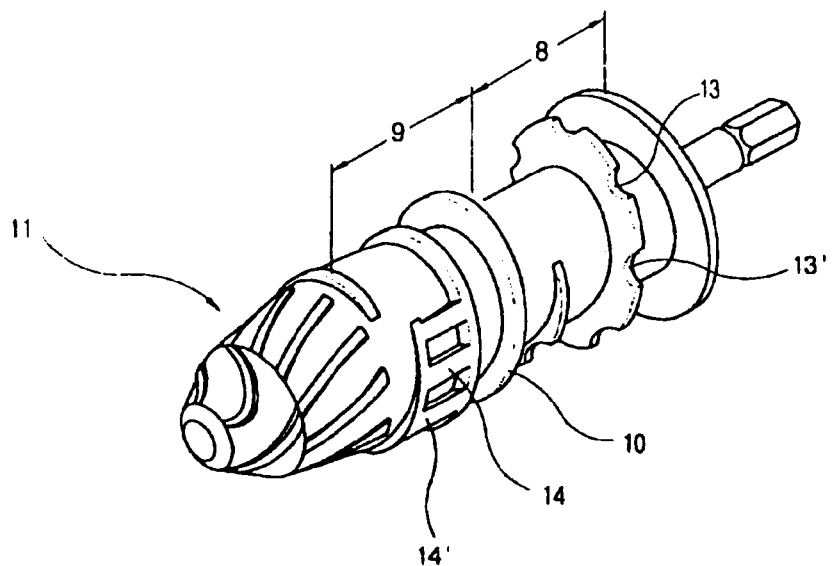
FIG. 3 is a detailed perspective view of a screw in accordance with the invention.

Referring to FIGS. 1 and 2, there is provided crusher 100 comprising housing 1 for a user hold and a motor(not shown) installed inside the housing 1. A drum member 4 is assembled to a front portion of the housing 1. The drum member 4 includes an inlet portion 2 for introducing foodstuffs therein and an extended portion 3 integrally formed with the inlet portion 2. Preferably, The extended portion 3 has a hollow cylindrical shape. An internal cylindrical member 6 is inserted into the extended portion 3 of the drum member 4. In accordance with the invention, the internal cylindrical member 6 is formed with a plurality of screw knife-edges 5 and 5' along the inner peripheral surface thereof. There is provided a screw member 11 inserted into the internal cylindrical member 6, as shown in detail in FIG. 3. The screw member 11 is successively formed with a transferring thread portion 8 and a crushing thread portion 9 at outer surface thereof. Additionally, there is provided a cap 7 assembled to a front portion of the extended portion 3 of the drum member 4 for fixing the internal cylindrical member 6 to the drum member 4.

In accordance with a preferred embodiment of the invention, the inlet portion 2 of the drum member 4 extends toward the transferring thread portion 8 of the screw member 11, and the extended portion 3 of the drum member 4 extends along the screw member 11.

In accordance with a preferred embodiment of the invention, the transferring thread portion 8 of the screw member 11 is formed with a plurality of cut portions 13 and 13' for pre-crushing the foodstuffs drawn down thereonto.

In accordance with a preferred embodiment of the invention, the crushing thread portion 9 of the screw member 11 is formed with a plurality of jaws 14 and 14' for increasing a frictional force against the inner cylindrical member 6. Preferably, the jaws 14 and 14' are located between the thread pitches 10.

In accordance with a preferred embodiment of the invention, the internal cylindrical member 6 is formed with a shoulder 12 along a front circumferential portion thereof for fixedly engaging with the cap 7.

In accordance with a preferred embodiment of the invention, engaging portions 15 and 15' between the internal cylindrical member 6 and the cap 7 are tapered for press-fit the same.

As an important aspect of the invention, the internal cylindrical member 6 and the screw member 11 are surface treated for anti-fermentation of the remaining sludge. Preferably, the surface treatment includes melamine resin plus ceramic powder deposition and anti-fermentation liquid coating. The sludge is referred as a waste remaining after crushing out the foodstuffs.

Figure 4:
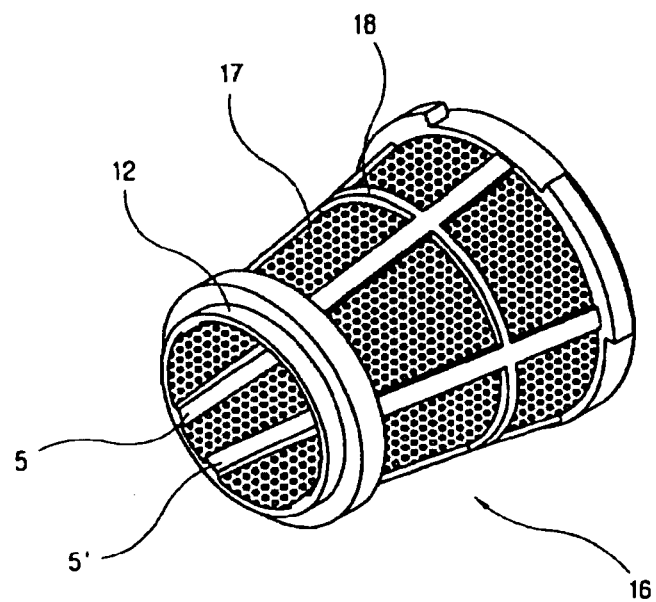
FIG. 4 is a perspective view of a mesh part in accordance with the invention.
Figure 5:
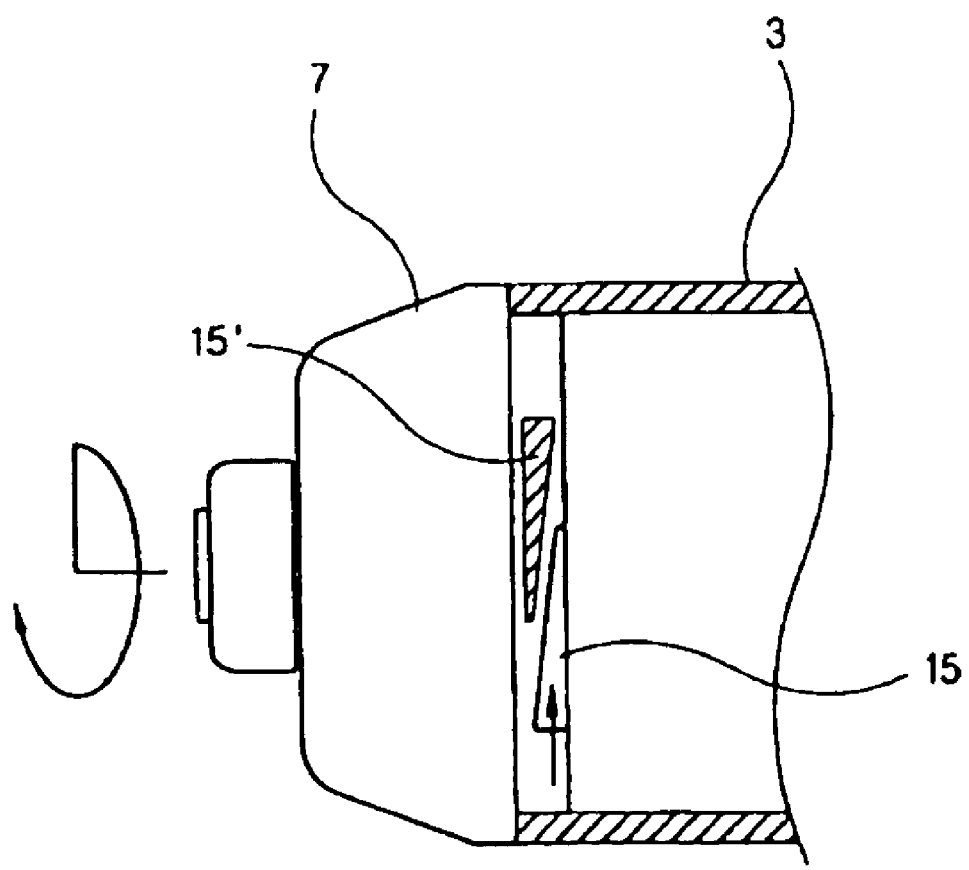
FIG. 5 is a schematic view of an engaging action of jaw members in accordance with the invention.

FIG. 4 shows a cylindrical mesh member 16 is shown. Referring to FIG. 4, as an alternatives, the cylindrical mesh member 16 can replace the internal cylindrical member 6 in case of crushing a juice. The mesh member 16 includes an extraction bag 17 and plural reinforcing ribs 18. Also in this case, the mesh member 16 is formed with plural knife-edges 5 and 5' and front shoulder 12.

Hereinafter, the assembly and the operation of the crusher 100 according to one embodiment of the invention will be described.

Firstly, the screw 11, the drum member 4 and the internal cylindrical member 6 are assembled sequentially into the housing 1. Thereafter, the foodstuffs such as vegetables are drawn into the inlet portion 2 of the drum member 4 and then the motor is actuated, resulting in the rotation of the screw member 11. At this time, the drum member 4, the internal cylindrical member 6 and the cap 7 are engaged with each other via the tapered portions 15 and 15' so that they are stably pressed with each other without vibration when rotate by the motor actuation.

The foodstuffs falling onto the screw member 11 through the inlet portion 2 is firstly transferred by the transferring thread portion 8 and at the same time is partly crushed by the cut portions 13 and 13', resulting in a generation of more smaller particles. The feature guarantees that the power consumption decreases and the load applied onto the internal cylindrical member 6 is weakened assisted by the front shoulder 12 giving a reinforcing structural resistance.

Thereafter, the transferring foodstuffs reaches the crushing thread portion 9 of the screw member 11 so as to be cut and crushed into more smaller particles by the frictional interaction of the thread portion 9 and the knife-edges 5 and 5' inside the internal cylindrical member 6. As an important operational function of the invention, the crushing foodstuffs are further crushed by the jaws 14 and 14' at the front portion of the screw member 11 with the pressing surface interaction with the inner surface of the internal cylindrical member 6 so as to be very finely grinded.

When a user want to extract the juice from the fruits, the only thing to do is to replace the internal cylindrical member 6 with the mesh member 16. The operation of this case is the same as that of the internal cylindrical member usage.

In addition, since the screw member 11 is surface-treated through the melamine resin, the ceramic powder and the anti-fermentation solution, the screw member 11 emanates an infrared rays to the foodstuffs, thereby maintaining the freshness thereof and preventing the fermentation of the residual sludges so that sanitary environment is made inside the crusher 100.

By the use of the present invention, the foodstuffs to be crushed can be easily moved and effectively crushed by way of the cut portions at the transferring thread portion of the screw member and is finally crushed finely by way of the jaws between the crushing thread portion, resulting in a reliance of the defect-free structure. In addition, the fermentation of the sludge is restrained by the way of the shoulder structure at the front of the internal cylindrical member.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A device for crushing foodstuff, the device comprising:
    a housing for a user hold;
    a motor installed inside the housing;
    a drum member being assembled to a front portion of the housing and including an inlet portion for introducing foodstuffs therein and an extended portion integrally formed with the inlet portion;
    an internal cylindrical member inserted into the extended portion of the drum member, the internal cylindrical member being formed with a plurality of screw knife-edges along the inner peripheral surface thereof;
    a screw member inserted into the internal cylindrical member and formed with a plurality of cut portions for pre-crushing the foodstuffs drawn down thereonto, the screw member being successively formed with a transferring thread portion and a crushing thread portion at outer surface thereof; and
    a cap assembled to a front portion of the extended portion of the drum member for fixing the internal cylindrical member to the drum member.

2. The device according to claim 1, wherein the crushing thread portion of the screw member is formed with a plurality of jaws for increasing a frictional force against the inner cylindrical member.

3. The device according to claim 2, wherein the jaws are located between the thread pitches.

4. The device according to claim 1, wherein the internal cylindrical member is formed with a shoulder along a front circumferential portion thereof for fixedly engaging with the cap.

5. The device according to claim 1, wherein engaging portions between the internal cylindrical member and the cap are tapered for press-fit the same.

6. The device according to claim 1, wherein the internal cylindrical member and the screw member are surface treated for anti-fermentation.

7. the device according to claim 6, wherein the surface treatment includes melamine resin plus ceramic powder deposition and anti-fermentation liquid coating.

8. The device according to claim 1, further comprising a cylindrical mesh member, the mesh member replacing the internal cylindrical member in case of crushing a juice.

9. The device according to claim 8, wherein the cylindrical mesh member is formed with a plurality of cut portions for pre-crushing the foodstuffs drawn down thereonto.

* * * * *

UNITED STATES PATENT AND TRADEMARK OFFICE
CERTIFICATE OF CORRECTION

PATENT NO. : 6,394,377 B1
DATED : May 28, 2002
INVENTOR(S) : Go Jung Kim et al.

It is certified that error appears in the above-identified patent and that said Letters Patent is hereby corrected as shown below:

Column 6,
Line 1, change "the" to -- The -- (first occurrence).

Signed and Sealed this

First Day of October, 2002

Attest:

Attesting Officer

JAMES E. ROGAN
Director of the United States Patent and Trademark Office